United States Patent
Yamamura

(10) Patent No.: US 10,550,923 B2
(45) Date of Patent: Feb. 4, 2020

(54) DRIVING FORCE ADJUSTMENT APPARATUS

(71) Applicant: MITSUBISHI JIDOSHA KOGYO KABUSHIKI KAISHA, Tokyo (JP)

(72) Inventor: Takuya Yamamura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/117,876

(22) Filed: Aug. 30, 2018

(65) Prior Publication Data
US 2019/0072169 A1    Mar. 7, 2019

(30) Foreign Application Priority Data
Sep. 1, 2017    (JP) .................................. 2017-168707

(51) Int. Cl.
*F16H 48/36*    (2012.01)

(52) U.S. Cl.
CPC ....... *F16H 48/36* (2013.01); *F16H 2048/364* (2013.01); *F16H 2048/368* (2013.01)

(58) Field of Classification Search
CPC ...................................................... F16H 48/36
See application file for complete search history.

(56) References Cited

U.S. PATENT DOCUMENTS

| | | | |
|---|---|---|---|
| 2019/0072168 A1* | 3/2019 | Yamamura | ................ B60K 1/00 |
| 2019/0283566 A1* | 9/2019 | Nilsson | .................... B60K 6/48 |

FOREIGN PATENT DOCUMENTS

| | | |
|---|---|---|
| JP | 2007-177915 A | 7/2007 |
| JP | 2014-37884 A | 2/2014 |

* cited by examiner

*Primary Examiner* — Derek D Knight
(74) *Attorney, Agent, or Firm* — Birch, Stewart, Kolasch & Birch, LLP

(57) ABSTRACT

A differential apparatus including a pair of left and right outputting shafts is interposed between a left shaft and a right shaft of a vehicle, and a motor is coupled to the differential apparatus. A reverse rotating mechanism which generates rotation being reverse to a first outputting shaft being one of the outputting shafts and having a same rotational speed as the first outputting shaft is provided. A changeover mechanism for controlling a power transmission state is interposed between the left shaft coupled to the first outputting shaft and the reverse rotating mechanism. The changeover mechanism has a first state where the left shaft is coupled to the first outputting shaft, a second state where the left shaft in not coupled to the differential apparatus and the reverse rotating mechanism, and a third state where the left shaft is coupled to the reverse rotating mechanism.

18 Claims, 7 Drawing Sheets

US 10,550,923 B2

DRIVING FORCE ADJUSTMENT APPARATUS

CROSS-REFERENCE TO THE RELATED APPLICATION

This application incorporates by references the subject matter of Japanese Patent Application No. 2017-168707 filed in Japan on Sep. 1, 2017 on which a priority claim is based under 35 U.S.C. § 119(a).

FIELD

This disclosure relates to an apparatus that adjusts driving forces of the left and right wheels of a vehicle.

BACKGROUND

A driving force adjustment apparatus is known to the inventors in which a differential apparatus interposed between the left and right wheels of a vehicle and a motor are combined such that distribution of the driving force (torque distribution) between the left and right wheels can be changed. In such a driving force adjustment apparatus as just described, the motor rotates passively in response to the difference between rotational speeds of the left and right wheels upon turning of the vehicle to absorb the rotational speed difference. Further, as the motor operates actively, the driving force difference between the left and right wheels increases or decreases to change the distribution of the driving force between the left and right wheels (e.g. JP 2007-177915 A, JP 2014-037884 A).

A conventional driving force adjusting apparatus is provided with a motor for adjusting distribution of driving force between the left and right wheels separately from a driving source for driving the left and right wheels. This makes it difficult to reduce the weight and the size of the apparatus and its mountability is liable to worse. The increase in weight of the driving force adjustment apparatus would degrade the operation performance of the vehicle.

SUMMARY

An aspect of the present invention is the driving force adjustment apparatus includes a differential apparatus that includes a differential gear, supported by a differential case, and a pair of left and right outputting shafts and that is interposed between a left shaft and a right shaft of a vehicle, and a motor coupled to the differential apparatus. The driving force adjustment apparatus further includes a reverse rotating mechanism that is connected to a first outputting shaft being one of the outputting shafts of the differential apparatus and that generates rotation being reverse to rotation of the first outputting shaft and having a same rotational speed as the rotation of the first outputting shaft; and a changeover mechanism that is interposed between the first outputting shaft and one of the left shaft and the right shaft and that controls a power transmission state. The changeover mechanism has a first state in which the one of the left shaft is coupled to the right shaft to the first outputting shaft, a second state in which one of the left shaft and the right shaft is not coupled to the differential apparatus and the reverse rotating mechanism, and a third state in which one of the left shaft and the right shaft is coupled to the reverse rotating mechanism.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

[1. Structure]

Figure 1:
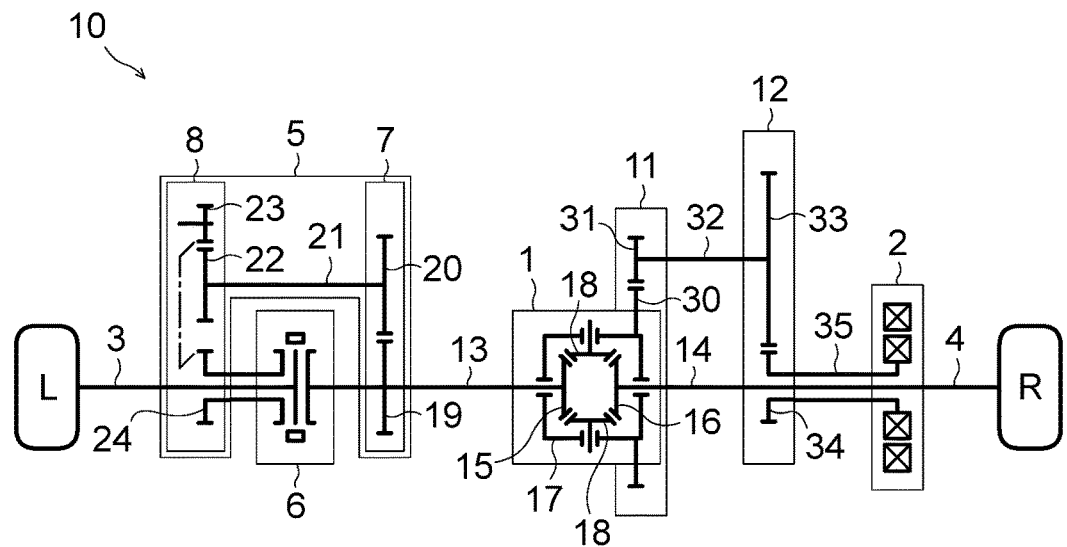
FIG. 1 is a skeleton diagram of a driving force adjustment apparatus according to an embodiment.

In the following, a driving force adjustment apparatus 10 as an embodiment is described with reference to the drawings. The driving force adjustment apparatus 10 of FIG. 1 compatibly has a function for transmitting the driving force transmitted from the motor 2 serving as the driving source of a vehicle to the left and right wheels to let the vehicle travel, and a function for passively absorbing the difference between the rotational speeds of the left and right wheels appearing when the vehicle is turning, and a function for actively adjusting the difference between the rotational speeds of the left and right wheels to change the distribution of the driving force. The driving force adjustment apparatus 10 is interposed between the left shaft 3 that is coupled to the left wheel L and the right shaft 4 that is coupled to the right wheel R. The left shaft 3 and the right shaft 4 are coaxially arranged. Hereinafter, the left shaft 3 and the right shaft 4 are sometimes simply referred to as the vehicle shafts 3 and 4.

The driving force adjustment apparatus 10 includes a differential apparatus 1, the motor 2, a reverse rotating mechanism 5, a changeover mechanism 6, a driving gear train 11, and a motor gear train 12. The differential apparatus 1 is a differential apparatus that is configured by interposing a differential gear supported by a differential case 17 in the form of a container between the left shaft 3 and the right shaft 4. The differential apparatus 1 includes a pair of left and right outputting shafts 13 and 14 and is interposed between the left shaft 3 and the right shaft 4. In the present embodiment, one outputting shaft 13 is coupled to the left shaft 3 through the changeover mechanism 6, and the other outputting shaft 14 is directly coupled to the right shaft 4.

A left bevel gear 15 coupled to the outputting shaft 13 on the left side, differential pinion gears 18 pivotally supported by the differential case 17, and a right bevel gear 16 coupled to the outputting shaft 14 on the right side are accommodated in a mutually meshing state in the inside of the differential case 17. The left bevel gear 15, the differential case 17, and the right bevel gear 16 are capable of transmitting power to one another, and have respective structures (positions, shapes, and teeth numbers) set such that the rotational speeds thereof on the velocity diagram (the alignment chart) are linearly arranged in this sequence. The rotation shafts of the left bevel gear 15 and the right bevel gear 16 are collinearly arranged while the rotation shafts of the differential pinion gears 18 is arranged perpendicularly to those of the left bevel gear 15 and the right bevel gear 16.

The motor 2 is an electric motor to drive the left wheel L and the right wheel R of the vehicle and is coupled to the differential apparatus 1. The outputting shaft 35 of the motor 2 is coaxially arranged with the vehicle shafts 3 and 4. The motor 2 of the present embodiment is disposed on the right side of the differential apparatus 1 and the outputting shaft 35 of the motor 2 is coaxially arranged with the right shaft 4. The electric power to drive the motor 2 is supplied from a non-illustrated on-vehicle battery. The driving force of the motor 2 is controlled by a non-illustrated electronic controlling apparatus (computer). For example, when the motors 2 is an AC electric motor, the electronic controlling apparatus controls the driving force of the motor 2 by adjusting the frequency of the AC electric power to be supplied to the motor 2. In contrast, when the motor 2 is a DC electric motor, the electronic controlling apparatus controls the driving force of the motor 2 by adjusting the electric current to be supplied to the motor 2.

The target to which the driving force of the motor 2 is output is the differential case 17 of the differential apparatus 1. The motor 2 sometimes functions as a traveling motor that provides the same driving force to the left shaft 3 and the right shaft 4, and sometimes functions as an adjusting motor that generates a difference between the rotational speeds of the left and right wheels. As the above, the motor 2 exerts different functions, depending on the traveling state of the vehicle. The function of the motor 2 is changed over by changing power transmission route such as the reverse rotating mechanism 5 and the changeover mechanism 6. Accordingly, when the motor 2 is exerting the former function, the latter function is stopped, and when the motor 2 is exerting the latter function, the former function is stopped.

The reverse rotating mechanism 5 is a mechanism that generates rotation being reverse to rotation of the one of the outputting shafts 13 and 14 included by the differential apparatus 1 and having the same rotational speed as that of the one of the outputting shafts 13 and 14 and is coupled to the one of the outputting shafts 13 and 14. In the example of FIG. 1, the outputting shaft 13 corresponds to "the one of the outputting shafts 13 and 14". The reverse rotating mechanism 5 generates rotation being reverse to the rotation of the outputting shaft 13 and having the same rotational speed as that of the outputting shaft 13 and rotates a gear 24 that is to be detailed below. Consequently, under a state where the outputting shaft 13 is directly coupled to the left shaft 3, the gear 24 rotates in the opposite direction to the left shaft 3.

When there is no need to drive the vehicle by the driving force of the motor 2 (for example, while the vehicle is coasting or while the vehicle can obtain sufficient driving force from a non-illustrated another driving source), the reverse rotating mechanism 5 is activated and functions to rotate a left bevel gear 15 and a right bevel gear 16 of the differential apparatus 1 in opposite directions at the same rotational speed. When the reverse rotating mechanism 5 is coupled to the outputting shaft 13 on the left side as shown in FIG. 1 (i.e., when the reverse rotating mechanism 5 is applied to the left wheel L), a power transmission route that rotates the outputting shaft 13 in the opposite direction to the rotation direction of the left wheel L is formed. The reverse rotating mechanism 5 is not activated while the motor is functioning as a traveling motor, but is activated while the motor 2 is functioning as an adjusting motor.

Figure 2:
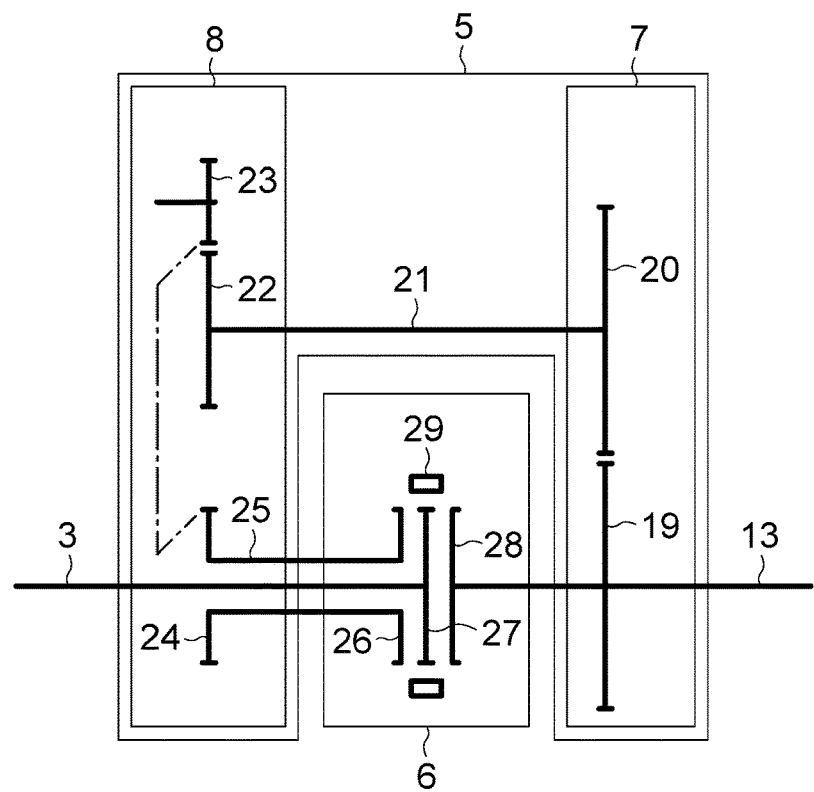
FIG. 2 is a skeleton diagram of a reverse rotating mechanism and a changeover mechanism.

The changeover mechanism 6 is a mechanism that controls the power transmission state between a wheel that the reverse rotating mechanism 5 is applied to and the reverse rotating mechanism 5. The changeover mechanism 6 of the present embodiment is a dog clutch. A dog clutch here means a coupling device that has a function of changing over a connecting-disconnecting of rotational elements by sliding a sleeve 29 in the direction parallel with the rotation shaft and thereby engaging the sleeve 29 with multiple rotational elements. As illustrated in FIG. 2, the changeover mechanism 6 is interposed between the left shaft 3 and the outputting shaft 13. When the reverse rotating mechanism 5 is applied to the right wheel R, it is satisfactory that the changeover mechanism 6 is interposed between the right shaft 4 and the outputting shaft 14.

The changeover mechanism 6 is capable of changing over the power transmission state among three states (a first state, a second state, and a third state). The first state is a state where the left shaft 3 is coupled to the outputting shaft 13 of the differential apparatus 1. In the first state, the rotation direction of the left bevel gear 15 coincides with the rotation direction of the left wheel L. The second state is a state where the left shaft 3 is made not be coupled from the differential apparatus 1 and the reverse rotating mechanism 5. In the second state, the left wheel L is in the free state of being completely separated from, for example, the motor 2, the differential apparatus 1, and the reverse rotating mechanism 5. The third state is a state where the left shaft 3 is coupled to the reverse rotating mechanism 5. In the third state, the rotation direction of the left bevel gear 15 is opposite to the rotation direction of the left wheel L. The operation state (the three states) of the changeover mechanism 6 is controlled by a non-illustrated Electronic controlling apparatus (computer).

Detailed description will now be made in relation to the structures of the reverse rotating mechanism 5 and the changeover mechanism 6. As illustrated in FIG. 2, the reverse rotating mechanism 5 has a first gear train 7 and a second gear train 8 built in it. The first gear train 7 is a gear train that includes multiple gears 19 and 20 each having a rotation shaft parallel with the outputting shaft 13 of the differential apparatus 1. Likewise, the second gear train 8 is a gear train that includes multiple gears 22, 23, and 24 each having a rotation shaft in parallel with the outputting shaft 13. The gear 19 has a center of rotation coupled to the outputting shaft 13; the gear 20 has a center of rotation coupled to a shaft 21 and is coaxial with the gear 22 through the shaft 21. The rotation shaft of the gear 23 is arranged in parallel with the outputting shaft 13 and the rotation shaft (shaft 25) of the gear 24 is coaxially arranged with the left shaft 3. The gear 23 and the gear 24 are coupled to each other in a state meshing with each other as shown by the one-dotted line (a power transmission route) of FIG. 2.

The second gear train 8 has a function of causing the rotation of the outputting shaft 13 and the rotation of the left shaft 3 to be in the reverse directions to each other, but to have the same rotational speed. This means that the reduction ratio of the second gear train 8 is set to be a value obtained by inverting the sign of the reciprocal of the reduction ratio of the first gear train 7. Assuming that the reduction ratio of the first gear train 7 is 0.8, the reduction ratio of the second gear train 8 is set to be $-1/0.8$. In other words, the reduction ratios of the first gear train 7 and the second gear train 8 are set such that the product of the reduction ratios of the first gear train 7 and the second gear train 8 comes to be $-1$. With this setting, rotation in the reverse direction to the rotation transmitted from the outputting shaft 13 is transmitted to the left shaft 3. Otherwise, rotation in the reverse direction to the rotation transmitted from the left shaft 3 is transmitted to the outputting shaft 13. The first gear train 7 of the present embodiment is a gear train having a single power transmission route and includes an even number of gears. In contrast, the second gear train 8 of the present embodiment is a gear train having a single power transmission route and includes an odd number of gears.

The changeover mechanism 6 is provided with a first hub 26, a second hub 27, a third hub 28, and the sleeve 29. The first hub 26 is an engaging element that rotates in synchronization with the gear 24 through the shaft 25. The second hub 27 is an engaging element fixed to the left shaft 3; and the third hub 28 is an engaging element fixed to the outputting shaft 13. The sleeve 29 is disposed on the outer circumferences of the hubs 26-28 and slidable in the direction parallel with the rotation shaft of the hubs 26-28.

On the respective outer circumference faces of the hubs 26-28, projections are formed which extend in the parallel direction with the axes of the left shaft 3 and the outputting shaft 13. In contrast, a recess groove fit to the projections is formed on the inner circumference face of the sleeve 29. The state of engaging of the hubs 26-28 with the sleeve 29 is changed over by sliding the sleeve 29, and thereby the above three states (the first state, the second state, and the third state) are changed over. The first state is a state where the sleeve 29 is engaged with the second hub 27 and the third hub 28. The second state is a state where the sleeve 29 is engaged only with the second hub 27 (or only with the first hub 26 or only with the third hub 28). The third state is a state where the sleeve 29 is engaged with the first hub 26 and the second hub 27.

The driving gear train 11 is a gear train interposed between the motor 2 and the differential apparatus 1, and has a function of adjusting the reduction ratio of the driving force input into the differential apparatus 1 (i.e., the reduction ratio of driving force input from the side of the motor gear train 12). The driving gear train 11 is provided with multiple gears 30 and 31 having rotation shafts parallel with the outputting shaft 14 of the differential apparatus 1. The gear 30 is integrated with the differential case 17 of the differential apparatus 1 and the gear 31 is coupled to the motor gear train 12 through the shaft 32.

The motor gear train 12 is a gear train interposed between the driving gear train 11 and the motor 2, and has a function of adjusting the reduction ratio of the motor 2 (i.e., the reduction ratio of driving force input from the side of the motor 2). The motor gear train 12 is provided with multiple gears 33 and 34 having rotation shafts parallel with the outputting shaft 14 of the differential apparatus 1 and the outputting shaft 35 of the motor 2. The gear 34 is coupled to the outputting shaft 35 of the motor 2 and the gear 33 is coupled to the gear 31 of the driving gear train 11.

[2. Action]

[2-1. First State]

Figure 3A:
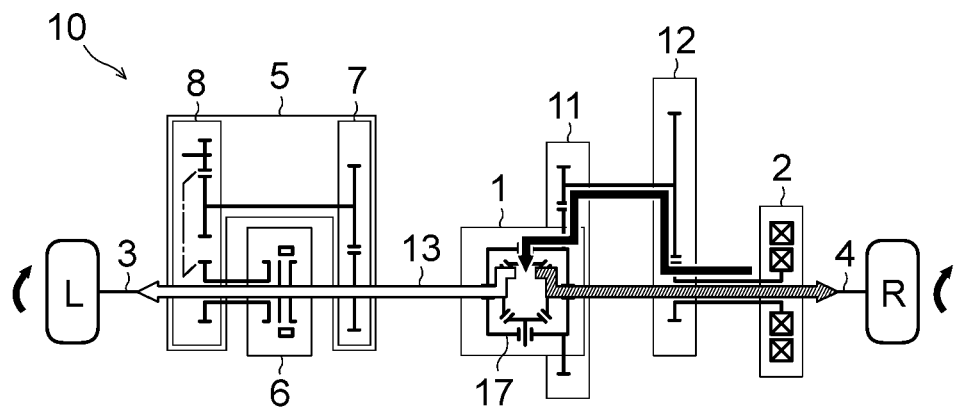
FIGS. 3A and 3B are diagrams describing a first state of a changeover mechanism.
Figure 3B:
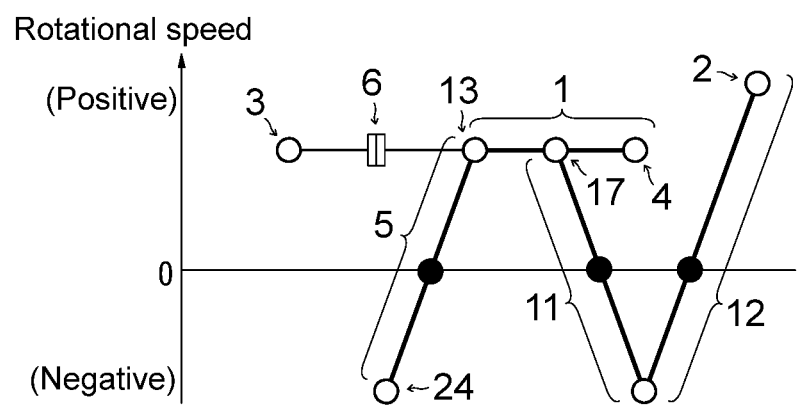

FIG. 3A is a skeleton diagram describing the power transmission route when the changeover mechanism 6 is in the first state, and FIG. 3B is a velocity diagram when the changeover mechanism 6 is in the first state. A velocity diagram simply expresses the relationship among rotational speeds (angular velocities) of multiple rotational elements correlated to one another. As shown in FIG. 3B, in a velocity diagram of the present embodiment, a coordinate of the ordinate axis represents a rotational speed of a rotational element. The coordinate of the abscissa axis corresponding to the reference line at which the rotational speed comes to be zero is set in accordance with an angular velocity ratio (or a rotational speed ratio, a circumference length ratio, a teeth number ratio) based on one of the correlated rotational elements. Normally, the respective abscissa positions of the rotational elements are set in such a manner that the rotational speeds of the correlated rotational elements are on the same straight line regardless the magnitudes of the rotational numbers thereof. In other words, the abscissa positions are set such that the straight lines that connect each pair of the rotational elements has the collinear relationship.

While the changeover mechanism 6 is in the first state, the sleeve 29 of the changeover mechanism 6 is engaged with the second hub 27 and the third hub 28, and the outputting shaft 13 is directly coupled to the left shaft 3. During the first state, the motor 2 functions as the traveling motor. As shown in FIG. 3A, the driving force of the motor 2 is transmitted to the two outputting shafts 13 and 14 through the differential case 17 of the differential apparatus 1, and thereby the left wheel 3 and the right wheel 4 are driven. The black arrow in FIG. 3A represents a power transmission route of a driving force transmitted from the motor 2 to the differential case 17 of the differential apparatus 1, and the white arrow represents a power transmission route to the side of the left shaft 3 and the hatched arrow represents a power transmission route to the right shaft 4. The rotational speed of the differential case 17 is proportional to the rotational speed of the motor 2. The outputting shaft 13 of the differential apparatus 1 is coupled to the left shaft 3 through the changeover mechanism 6. With this configuration, if the vehicle starts under a state where the loads (resistances) on the left wheel L and the right wheel R are the same, the rotational speed of the left shaft 3 comes to be the same as the rotational speed of the right shaft 4. This means that, as shown in FIG. 3B, the left shaft 3, the right shaft 4, the outputting shaft 13, and the differential case 17 are in a state of rotation of being coupled to one another by a horizontal lines, so that the vehicle travels straight.

If a rotational speed difference is generated between the left and right wheels during the above state, differential pinion gears 18 passively rotate according to the rotational speed difference and thereby the rotational speed difference is absorbed. At that time, the gears 19, 20, 22, and 23 of the reverse rotating mechanism 5 are in a state being driven by the outputting shaft 13. However, the gear 24 of the reverse rotating mechanism 5 is not coupled to the left shaft 3 and is racing with respect to the left shaft 3. Accordingly, the reverse rotating mechanism 5 is excluded from the power transmission route, and the rotation direction of the left shaft 3 is the same direction as that of the rotation of the outputting shaft 13.

[2-2. Second State]

Figure 4A:
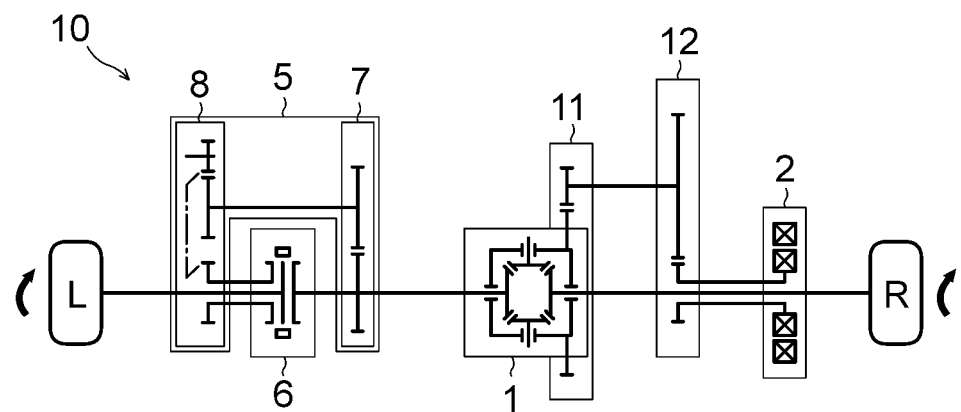
FIGS. 4A and 4B are diagrams describing a second state of a changeover mechanism.
Figure 4B:
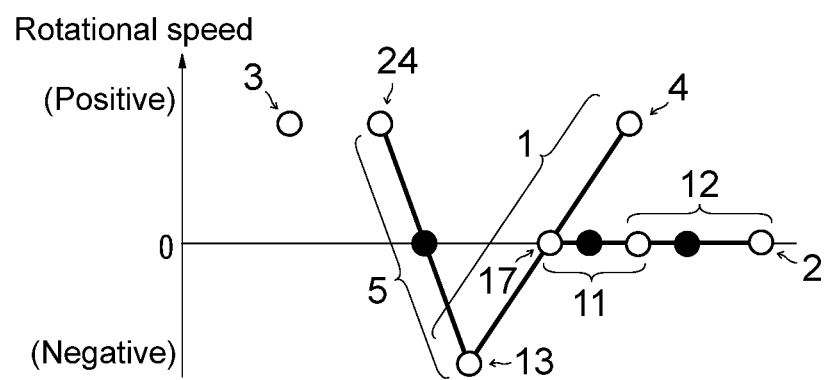

As shown in FIG. 4A, when the changeover mechanism 6 is changed over from the first state to the second state while the vehicle is traveling, the sleeve 29 of the changeover mechanism 6 comes to be engaged only with the second hub 27, the left shaft 3 is disengaged from the outputting shaft 13, and the left wheel L and the right wheel R come into a coasting state (free-rotating state). If the control of the motor 2 is stopped (the rotational speed of the motor 2 is controlled to be zero), the rotational speed of the differential case 17 comes to be zero while the right wheel R keeps to rotate. This causes the outputting shaft 13 to rotate in the reverse direction to the rotation of the outputting shaft 14 at the same rotational speed as each other, as shown in FIG. 4B. At this time, the left shaft 3 is disengaged from the motor 2 and the right shaft 4 is coupled to the motor 2 through the differential case 17 having a rotational speed of zero, so that the coasting is in a state of not being affected by the rotation loss of the motor 2.

[2-3. Third State]

Figure 5A:
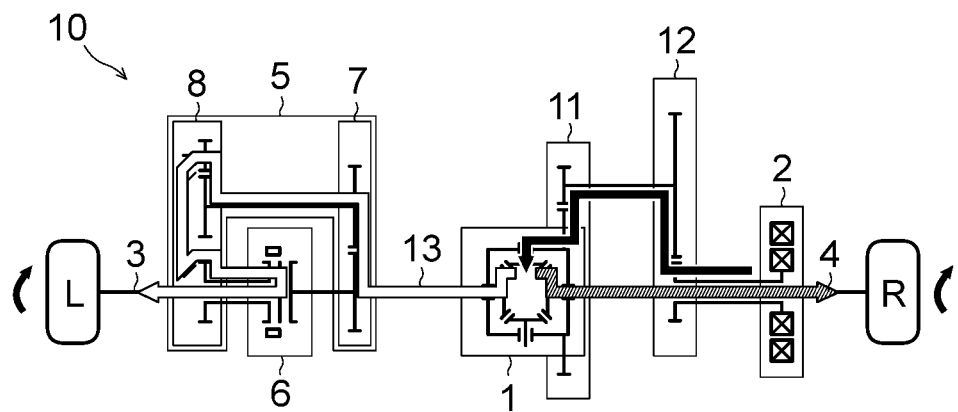
FIGS. 5A to 5D are diagrams describing a third state of a changeover mechanism.
Figure 5B:
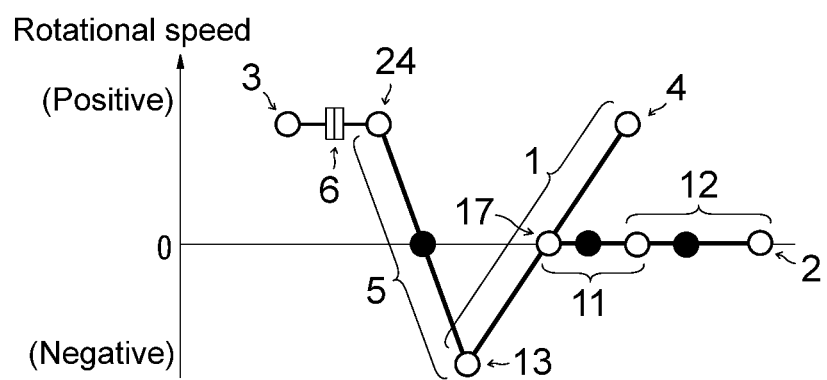

As shown in FIG. 5A, when the changeover mechanism 6 is changed over from the second state to the third state, the sleeve 29 of the changeover mechanism 6 is engaged with the first hub 26 and the second hub 27, and the outputting shaft 13 is coupled to the left shaft 3 through the reverse rotating mechanism 5. This means that the left shaft 3 and the right shaft 4 are coupled to each other through the reverse rotating mechanism 5 and the differential apparatus 1, as shown in FIG. 5B. At this time, the outputting shaft 13 and the left shaft 3 rotate in the reverse directions to each other at the same rotational speed. Here, if the left wheel L and the right wheel R have the same rotational speed, the rotational speeds of the differential case 17, the driving gear train 11, the motor gear train 12, and the motor 2 come to be zero.

Figure 5C:
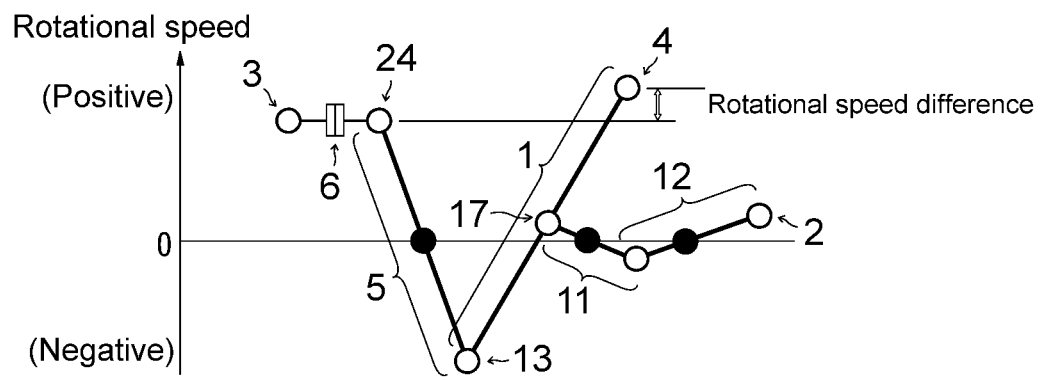
Figure 5D:
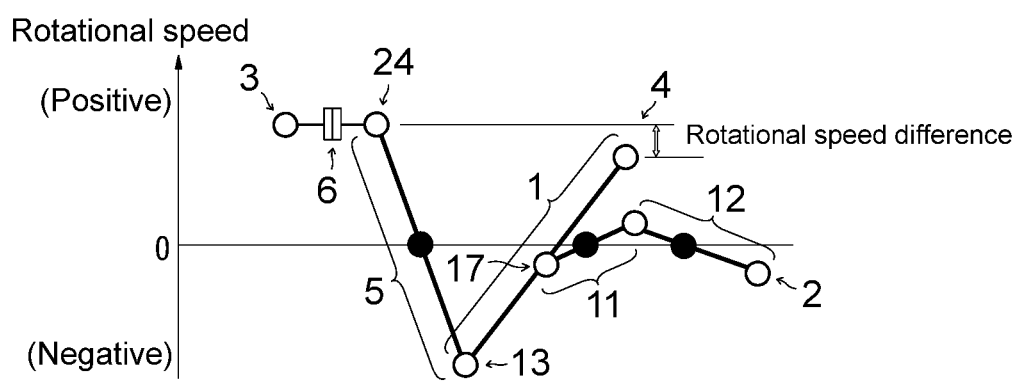

In the third state, the motor 2 functions as an adjusting motor. When the motor 2 is driven to rotate, the rotational speed of the differential case 17 of the differential apparatus 1 increase or decrease in response to the driving. On the other hand, since the left bevel gear 15, the differential case 17, and the right bevel gear 16 of the differential apparatus 1 are positioned on the same line in the velocity diagram, the rotational speeds of the right shaft 4 and the left shaft 3 change with a change in the rotational speed of the differential case 17. For example, if the rotational speed of the motor 2 is increased in the same direction as the rotation direction of the right shaft 4, the rotational speed of the right shaft 4 comes to be larger than that of the left shaft 3 as shown in FIG. 5C. In contrast, the motor 2 is rotated in the opposite direction to the rotation direction of the right shaft 4, the rotational speed of the right shaft 4 comes to be smaller than that of the left shaft 3 as shown in FIG. 5D. The difference between the rotational speeds of the left shaft 3 and the right shaft 4 depends on the rotational speed and the rotation direction of the motor 2. At that time, if the left wheel L and the right wheel R have loads to suppress the above change of the rotational speeds, a difference of driving force corresponding to the driving force of the motor 2 is generated between the left and right wheels.

[3. Effects]

(1) According to the above driving force adjustment apparatus 10, by controlling the changeover mechanism 6 into the first state and the third state, the motor 2 can be made to solely exert a function of driving the left and right wheels and a function of adjusting the driving force difference between the left and right wheels, so that the structure of the driving force adjustment apparatus 10 can be simplified. This makes it possible to reduce the size and weight of the driving force adjustment apparatus 10 with ease, enhance the mountability onto the vehicle, and avoid degradation of operation performance of the vehicle. In contrast, by controlling the changeover mechanism 6 into the second state, the power transmission route from the motor 2 to the driving wheels (left wheel L, right wheel R) can be disconnected, and thereby the motor loss while the vehicle is coasting can be suppressed. Providing the reverse rotating mechanism 5 makes it possible to rotate a pair of the outputting shafts 13 and 14 disposed on the left and the right side of the differential apparatus 1 in the reverse directions to each other. In other words, as illustrated in FIG. 4B of the second state and FIG. 5B of the third state, the rotational speeds of the differential case 17, the driving gear train 11, the motor gear train 12, and the motor 2 can be kept 0 while the vehicle is coasting or traveling straight, so that the unrequired rotation loss can be suppressed.

(2) The above driving force adjustment apparatus 10 is provided with the first gear train 7 and the second gear train 8. The first gear train 7 is provided with the gears 19 and 20, which have rotation shafts arranged in parallel with the outputting shaft 13. Likewise, the second gear train 8 is provided with the gears 22, 23, and 24, which have rotation shafts arranged in parallel with the outputting shaft 13. The reduction ratio of the second gear train 8 is set to be a value obtained by inverting the sign of the reciprocal of the reduction ratio of the first gear train 7. A simple configuration using two series of gear trains having shafts in parallel with each other can efficiently generate reverse rotation, so that a loss related to adjustment of a driving force difference between the left and right wheels can be reduced.

(3) Since the above driving force adjustment apparatus 10 uses a dog clutch having a small dragging loss as the changeover mechanism 6, it is possible to suppress the degrading of the transmission efficiency of the driving force. Besides, the structure of the driving force adjustment apparatus 10 can be simplified, and the weight and the size of the driving force adjustment apparatus 10 can be encouraged to be further smaller.

(4) The above driving force adjustment apparatus 10 is provided with the driving gear train 11 and the motor gear train 12, and arranges the motor 2 coaxially with the vehicle shafts 3 and 4. This allows the driving force adjustment apparatus 10 to have a small dimension in the forward and rearward direction (longitudinal direction) of the vehicle and to have enhanced the mountability onto the vehicle. For example, the driving force adjustment apparatus 10 can be mounted onto a vehicle having a very small space such as a compact car and an ultra-compact vehicle.

[4. Modification]

The foregoing embodiment is merely exemplary and has no intention to exclude various modifications and application of techniques not explicitly described in the embodiment. The structure of the embodiment can be variously modified without departing from the scope of the embodiment. The respective structures of the embodiment may be selected, omitted, or combined according to the requirement. For example, in the driving force adjustment apparatus 10 shown in FIG. 1, the reverse rotating mechanism 5 is coupled to the outputting shaft 13 on the left side, but may alternatively be coupled to the outputting shaft 14 disposed on the right side.

Figure 6:
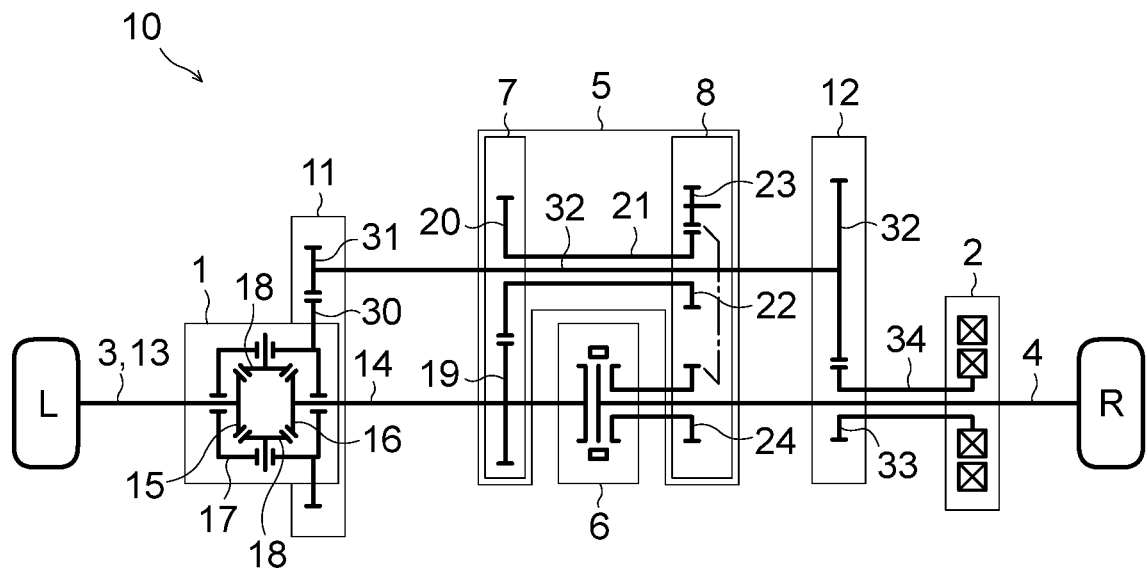
FIG. 6 is a skeleton diagram of a driving force adjusting apparatus according to a modification.

As illustrated in FIG. 6, the motor 2, the reverse rotating mechanism 5, and the changeover mechanism 6 may be collectively arranged on the right side of the differential apparatus 1. Otherwise, the motor 2, the reverse rotating mechanism 5, and the changeover mechanism 6 may be collectively arranged on the left side of the differential apparatus 1, which has the flip-horizontal structure to that of FIG. 6. This arrangement allows to easily install the driving force adjustment apparatus 10 from one of the left and right sides of the vehicle, so that the enhancement in productivity can be expected. In addition, this arrangement can integrate the electronic controlling apparatus for the changeover mechanism 6 and the electronic controlling apparatus for the motor 2, so that the mountability of the electronic controlling apparatuses can be enhanced.

Figure 7:
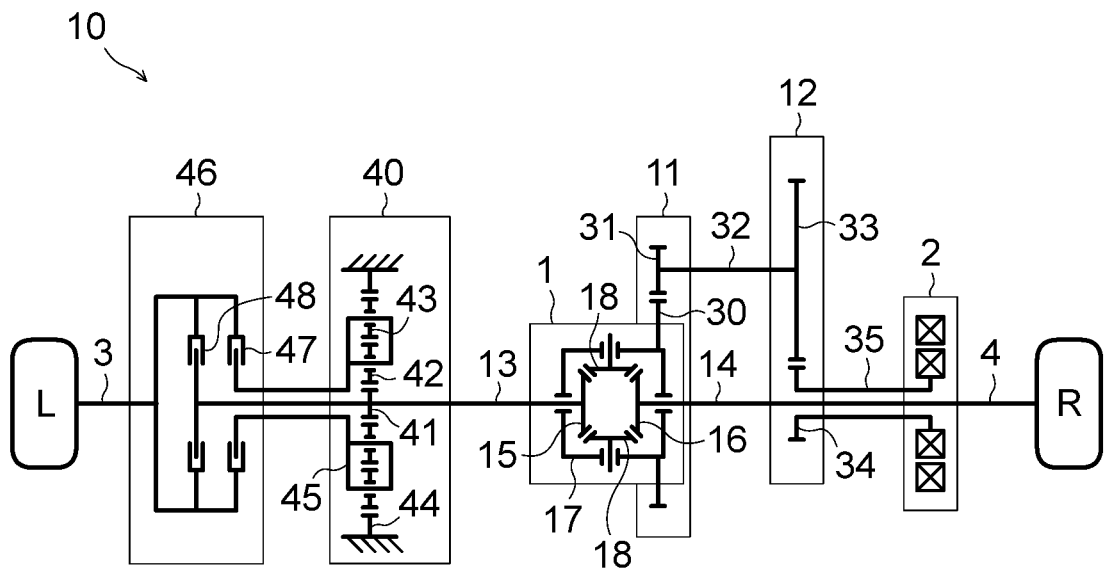
FIG. 7 is a skeleton diagram of a driving force adjusting apparatus according to another modification.

As shown in FIG. 7, the reverse rotating mechanism 5 may be formed of a planetary gear mechanism 40 of a double-pinion type. The planetary gear mechanism 40 includes a sun gear 41 coupled to the outputting shaft 13, a first planetary gear 42, a second planetary gear 43, a ring gear 44, and a carrier 45. The centers of rotation of the sun gear 41 and the carrier 45 are coaxially arranged and the rotation of the ring gear 44 is restrained. The first planetary gear 42 and the secondary planetary gear 43 are interposed between the sun gear 41 and the ring gear 44. The first planetary gear 42 is arranged such that the circumference face (gear) of the first planetary gear 42 meshes with the sun gear 41 and the second planetary gear 43, and the second planetary gear 43 is arranged such that the circumference face (gear) of the second planetary gear 43 meshes with the first planetary gear 42 and the ring gear 44.

The carrier 45 is coaxially rotatable with the rotation shaft of the sun gear 41 under a state where the carrier 45 is supporting the rotation shafts of the first planetary gear 42 and the second planetary gear 43. With this structure, the reduction ratio when the sun gear 41 is driven to be followed by the carrier 45 is $(\lambda-1)/\lambda$ (where $\lambda$ is a ratio of the teeth number of the sun gear 41 to the teeth number of the ring gear 44 and has a value $\lambda<1$), and the carrier 45 rotates in the opposite direction to the outputting shaft 13. Accordingly, appropriately setting teeth numbers of the sun gear 41, the first planetary gear 42, the second planetary gear 43 and the ring gear can achieve the same function as that of the reverse rotating mechanism 5. Since the planetary gear system 40 having the above structure can be coaxially arranged with the outputting shaft of the changeover mechanism 6, the longitudinal dimension of the vehicle can be further shortened, and thereby it is possible to allow the driving force adjustment apparatus 10 to be installed into a vehicle having no ample space in the longitudinal direction of the vehicle.

As illustrated in FIG. 7, the changeover mechanism 6 may be formed of a friction clutch 46. The friction clutch 46 includes a first clutch 47 and a second clutch 48. The first clutch 47 is an engaging element that connects and disconnects a power transmission route between the left gear 3 and the carrier 45, and the second clutch 48 is an engaging element that connects and disconnects a power transmission route between the left gear 3 and the sun gear 41. A state where only the second clutch 48 is connected corresponds to the first state and a state where only the first clutch 47 is connected corresponds to the third state. A state where the both clutches 47 and 48 are released corresponds to the second state. Using such a friction clutch 46 makes it possible to suppress possible changeover shock when the outputting shaft 13 is to be disengaged from or coupled to the left shaft, so that degrading of the comfortability of the passengers can be suppressed.

Figure 8:
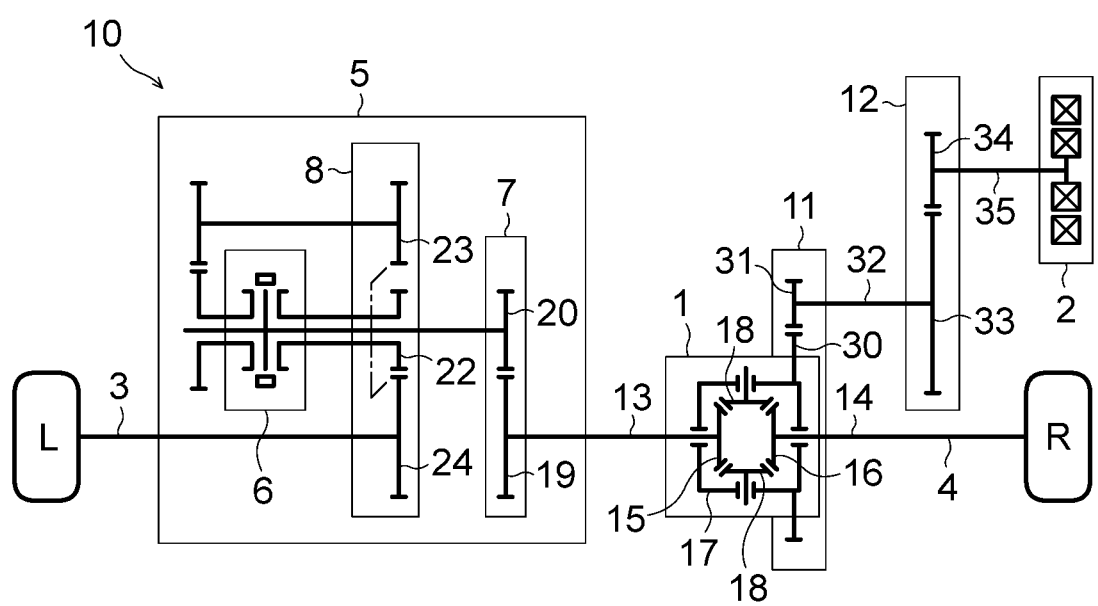
FIG. 8 is a skeleton diagram of a driving force adjusting apparatus according to an additional modification.

As shown in FIG. 8, the motor 2, the reverse rotating mechanism 5, and the changeover mechanism 6 are arranged offset positions from the vehicle shafts 3 and 4. With this structure, the changeover mechanism 6 may be interposed between the first gear train 7 and the second gear train 8 of the reverse rotating mechanism 5. This configuration that displaces the motor 2, the reverse rotating mechanism 5, and the changeover mechanism 6 from the portion above the vehicle shafts 3 and 4 makes it possible to prolong the vehicle shafts 3 and 4 and thereby to inhibited lowering of grounding capability of the vehicle. The reverse rotating mechanism 5 and the changeover mechanism 6 may be applied to the front vehicle shafts 3 and 4, the rear vehicle shafts 3 and 4, or both the front and rear vehicle shafts 3 and 4. Accordingly, the driving force adjustment apparatus 10 may be applied to either the front wheels or the rear wheels.

Both the function for driving the left and right wheels and the function for adjusting the driving force difference between the left and right wheels can be achieved by a single motor, so that the driving force adjustment apparatus can be simplified. Accordingly, this makes it possible to reduce the weight and the size of the driving force adjustment apparatus easily, to enhance its mountability, and to avoid degrading of the operation performance of the vehicle.

The invention thus described, it will be obvious that the same may be varied in many ways. Such variations are not to be regarded as a departure from the spirits and the scope of the invention, and all such modifications as would be obvious to one skilled in the art are intended to be included within the scope of the following claims.

REFERENCE SIGNS LIST 1 differential apparatus
2 motor
3 left shaft
4 right shaft
5 reverse rotating mechanism
6 changeover mechanism
7 first gear train
8 second gear train
10 driving force adjusting apparatus
11 driving gear train
12 motor gear train
13 outputting shaft (first outputting shaft)
17 differential case

The invention claimed is:
1. A driving force adjustment apparatus comprising:
   a differential apparatus that includes a differential gear, supported by a differential case, and a pair of left and right outputting shafts and that is interposed between a left shaft and a right shaft of a vehicle;
   a motor coupled to the differential apparatus;
   a reverse rotating mechanism that is connected to a first outputting shaft being one of the outputting shafts of the differential apparatus and that generates rotation being reverse to rotation of the first outputting shaft and having a same rotational speed as the rotation of the first outputting shaft; and
   a changeover mechanism that is interposed between the first outputting shaft and one of the left shaft and the right shaft and that controls a power transmission state, wherein
   the changeover mechanism has a first state in which the one of the left shaft and the right shaft is coupled to the first outputting shaft, a second state in which one of the left shaft and the right shaft is not coupled to the differential apparatus and the reverse rotating mechanism, and a third state in which one of the left shaft and the right shaft is coupled to the reverse rotating mechanism.

2. The driving force adjustment apparatus according to claim 1, wherein:
   the reverse rotating mechanism comprises a first gear train and a second gear train each including a plurality of gears having rotation shafts parallel with the first outputting shaft; and
   a reduction ratio of the second gear train is set to be a value obtained by inverting a sign of a reciprocal of a reduction ratio of the first gear train.

3. The driving force adjustment apparatus according to claim 2, wherein:
   the changeover mechanism is a dog clutch.

4. The driving force adjustment apparatus according to claim 3, further comprising:

a driving gear train that is interposed between the motor and the differential apparatus and that adjusts a reduction ratio of a driving force input into the differential apparatus; and a motor gear train that is interposed between the driving gear train and the motor, that adjusts a reduction ratio of a driving force input into the driving gear train, and that coaxially arranges a rotation shaft of the motor with the left shaft and the right shaft.

5. The driving force adjustment apparatus according to claim 2, wherein:
the changeover mechanism is a friction clutch.

6. The driving force adjustment apparatus according to claim 5, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

7. The driving force adjustment apparatus according to claim 2, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

8. The driving force adjustment apparatus according to claim 1, wherein:
the reverse rotating mechanism comprises a planetary gear mechanism that is coaxially arranged with the left shaft and the right shaft.

9. The driving force adjustment apparatus according to claim 8, wherein:
the changeover mechanism is a dog clutch.

10. The driving force adjustment apparatus according to claim 9, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

11. The driving force adjustment apparatus according to claim 8, wherein:
the changeover mechanism is a friction clutch.

12. The driving force adjustment apparatus according to claim 11, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

13. The driving force adjustment apparatus according to claim 8, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

14. The driving force adjustment apparatus according to claim 1, wherein:
the changeover mechanism is a dog clutch.

15. The driving force adjustment apparatus according to claim 14, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

16. The driving force adjustment apparatus according to claim 1, wherein:
the changeover mechanism is a friction clutch.

17. The driving force adjustment apparatus according to claim 16, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

18. The driving force adjustment apparatus according to claim 1, further comprising:
a driving gear train that is interposed between the motor and the differential apparatus and that adjusts a reduction ratio of a driving force input into the differential apparatus; and
a motor gear train that is interposed between the driving gear train and the motor, that adjusts a reduction ratio of a driving force input into the driving gear train, and that coaxially arranges a rotation shaft of the motor with the left shaft and the right shaft.

* * * * *